United States Patent
Hopkinson et al.

(10) Patent No.: US 9,735,528 B2
(45) Date of Patent: Aug. 15, 2017

(54) CABLELESS BATTERY INTEGRATION

(71) Applicant: Apple Inc., Cupertino, CA (US)

(72) Inventors: Ron A. Hopkinson, Campbell, CA (US); Eric A. Knopf, Mountain View, CA (US); Eugene Kim, San Francisco, CA (US); Peter M. Arnold, Cupertino, CA (US); Jim Hwang, Danville, CA (US); Matthew P. Casebolt, Fremont, CA (US)

(73) Assignee: Apple Inc., Cupertino, CA (US)

( * ) Notice: Subject to any disclaimer, the term of this patent is extended or adjusted under 35 U.S.C. 154(b) by 936 days.

(21) Appl. No.: 13/854,820

(22) Filed: Apr. 1, 2013

(65) Prior Publication Data
US 2013/0330975 A1 Dec. 12, 2013

Related U.S. Application Data

(60) Provisional application No. 61/656,739, filed on Jun. 7, 2012.

(51) Int. Cl.
*H02J 7/00* (2006.01)
*H01R 31/06* (2006.01)
(Continued)

(52) U.S. Cl.
CPC .......... *H01R 31/06* (2013.01); *G06F 1/26* (2013.01); *H01M 2/1022* (2013.01); *H01M 2010/4278* (2013.01)

(58) Field of Classification Search
USPC ....................................................... 320/107
See application file for complete search history.

(56) References Cited

U.S. PATENT DOCUMENTS 6,304,431 B1 10/2001 Kim
6,859,365 B2 2/2005 Koiwa et al.
(Continued)

FOREIGN PATENT DOCUMENTS

CN 201222208 Y 4/2009
CN 101599373 A 12/2009
(Continued)

OTHER PUBLICATIONS

Taiwanese Application No. 102116593 (Office action dated May 25, 2015).
(Continued)

*Primary Examiner* — Mohammed Alam
(74) *Attorney, Agent, or Firm* — Kilpatrick Townsend & Stockton LLP

(57) ABSTRACT

An interposer for electrically coupling a battery-management circuit board in a power supply and a motherboard is described. The interposer includes: a substrate having a top surface and a bottom surface; first spring connectors, disposed on the top surface, which electrically couple to the battery-management circuit board; and second spring connectors, disposed on the bottom surface and electrically coupled to the first spring connectors, which electrically couple to the motherboard. Spring connectors in a first subset of the first and second spring connectors that convey power signals have a first vertical height, and spring connectors in a second subset of the first and second spring connectors that convey monitoring signals for the power supply have a second, smaller vertical height. In this way, the first subset is activated before the second subset is activated, thereby ensuring that an electrical path for the power signals is established first.

18 Claims, 21 Drawing Sheets

(51) Int. Cl.
*G06F 1/26* (2006.01)
*H01M 2/10* (2006.01)
*H01M 10/42* (2006.01)

(56) References Cited

U.S. PATENT DOCUMENTS

| | | | |
|---|---|---|---|
| 7,280,347 B2 | 10/2007 | Wong et al. | |
| 8,054,644 B2 | 11/2011 | Chien | |
| 2004/0233630 A1* | 11/2004 | Imamura | G06F 1/1616 |
| | | | 361/679.57 |
| 2006/0166550 A1* | 7/2006 | Murr | H01R 13/6658 |
| | | | 439/540.1 |
| 2007/0035275 A1* | 2/2007 | Yang | G06F 1/1616 |
| | | | 320/112 |
| 2011/0287287 A1* | 11/2011 | Kang | H01M 2/1077 |
| | | | 429/82 |
| 2013/0148322 A1* | 6/2013 | Fosnes | H05K 1/141 |
| | | | 361/803 |
| 2013/0329349 A1 | 12/2013 | Hopkinson et al. | |

FOREIGN PATENT DOCUMENTS

| | | |
|---|---|---|
| CN | 101655723 A | 2/2010 |
| TW | 200426564 | 12/2004 |
| TW | M286464 U | 1/2006 |
| TW | M286465 | 1/2006 |

OTHER PUBLICATIONS

Chinese Patent Application No. 201310216519.9—Office Action dated Mar. 25, 2015.

* cited by examiner

┌─────────────────────────────────────────────────────────────────┐
│ PROVIDE ELECTRICAL POWER FROM BATTERY CELLS IN A POWER SUPPLY   │
│ TO A BATTERY-MANAGEMENT CIRCUIT BOARD IN THE POWER SUPPLY,      │
│ WHERE SUBSETS OF THE BATTERY CELLS, WHICH INCLUDE BATTERY CELLS │
│ HAVING DIFFERENT CAPACITIES, ARE ELECTRICALLY COUPLED TO THE    │
│ BATTERY-MANAGEMENT CIRCUIT BOARD SO THAT EACH OF THE SUBSETS    │
│ HAS A COMMON TOTAL CAPACITY                                     │
│ 1710                                                            │
└─────────────────────────────────────────────────────────────────┘

```
PROVIDE POWER SIGNALS FROM A BATTERY-MANAGEMENT CIRCUIT BOARD
TO A MOTHERBOARD IN A PORTABLE ELECTRONIC DEVICE VIA FIRST
SPRING CONNECTORS ON AN INTERPOSER
1810
```

```
PROVIDE MONITORING SIGNALS FROM THE BATTERY-MANAGEMENT
CIRCUIT BOARD TO THE MOTHERBOARD VIA SECOND SPRING
CONNECTORS ON THE INTERPOSER
1812
```

⟵1900

APPLY A SHEER FORCE TO A MECHANICAL COUPLING MECHANISM THAT MECHANICALLY COUPLES A BATTERY CELL TO AN EXTERNAL HOUSING OF A PORTABLE ELECTRONIC DEVICE USING A TAB MECHANICALLY COUPLED TO A SIDE OF THE PORTABLE ELECTRONIC DEVICE
1910

AFTER THE BATTERY CELL IS DETACHED FROM THE EXTERNAL HOUSING, REMOVE THE BATTERY CELL FROM THE PORTABLE ELECTRONIC DEVICE
1912

FIG. 19

```
                                                    ┌─2000
┌─────────────────────────────────────────────────────────┐
│ SINGULATE A MECHANICAL COUPLING MECHANISM THAT MECHANICALLY │
│ COUPLES A BATTERY CELL TO AN EXTERNAL HOUSING OF A PORTABLE │
│ ELECTRONIC DEVICE USING A DETACHMENT MECHANISM THAT IS      │
│ EMBEDDED IN THE MECHANICAL COUPLING MECHANISM               │
│                        2010                                 │
└─────────────────────────────────────────────────────────┘
                            ▼
┌─────────────────────────────────────────────────────────┐
│ AFTER THE BATTERY CELL IS DETACHED FROM THE EXTERNAL HOUSING, │
│ REMOVE THE BATTERY CELL FROM THE PORTABLE ELECTRONIC DEVICE   │
│                        2012                                 │
└─────────────────────────────────────────────────────────┘
```

FIG. 20

CABLELESS BATTERY INTEGRATION

CROSS REFERENCE TO RELATED APPLICATIONS

This application claims priority under 35 U.S.C. §119(e) to U.S. Patent Application Ser. No. 61/656,739, entitled "Cableless Battery Integration," by Ron A. Hopkinson, Eric A. Knopf, Eugene Kim, Peter Arnold, Jim Hwang, and Matthew P. Casebolt, filed Jun. 7, 2012, the contents of which is herein incorporated by reference.

This application is related to: U.S. Patent Application Ser. No. 61/656,721, entitled "External Battery-Management Module," by Christian A. Ligtenberg, Ron A. Hopkinson, and Robert S. Murphy, filed Jun. 7, 2012; and U.S. Patent Application Ser. No. 61/656,709, entitled "Different-Sized Battery Cells with Common Capacity," by Christian A. Ligtenberg, Robert S. Murphy, Brett W. Degner, Ron A. Hopkinson, Eugene Kim, Peter Arnold, and Jim Hwang, filed Jun. 7, 2012; U.S. Provisional Application Ser. No. 61/656,727, entitled "Battery Structure and Integration," by Ron A. Hopkinson, Brett W. Degner, and Robert S. Murphy, filed on Jun. 7, 2012; U.S. Provisional Application Ser. No. 61/656,744, entitled "Detachment Mechanism for Battery Removal," by Christian A. Ligtenberg, Matthew P. Casebolt, Robert S. Murphy, and Ron A. Hopkinson, filed on Jun. 7, 2012; and U.S. Provisional Application Ser. No. 61/656,700, entitled "Technique for Disabling a Power Supply," by Christian A. Ligtenberg, Eric A. Knopf, Matthew P. Casebolt, Peter M. Arnold, Ron A. Hopkinson, and Robert S. Murphy, filed on Jun. 7, 2012, the contents of all of which are herein incorporated by reference.

BACKGROUND

Field

The described embodiments relate to techniques for integrating batteries in portable electronic devices.

Related Art

The increasing functionality of portable electronic devices is placing commensurate demands on the batteries which are used to power these portable electronic devices. More specifically, the increasing density of circuits in integrated circuits, the increasing clock frequencies and the growing number of software applications executing on portable electronic devices are increasing their demand for power. However, the rate of growth in the energy density of batteries has not kept pace with the increasing demand for power. Moreover, size and weight constraints in portable electronic devices limit the number and size of the battery cells, and thus, their total capacity.

Furthermore, it can be difficult to address these challenges using existing battery organizations. For example, as shown in FIG. 1, which presents a block diagram of an existing battery 100 that includes battery cells 110 and a battery-management module 112 or battery-management circuit board (which monitors battery cells 110, and regulates charging and discharging of battery cells 110). These components are contained within a battery-pack housing 114 for ease of handling and to prevent damage to battery cells 110. However, this configuration consumes valuable space and, therefore, can restrict the total capacity of the battery cells.

SUMMARY

The described embodiments include an interposer with: a substrate having a top surface and a bottom surface; first spring connectors, disposed on the top surface, which electrically couple to a battery-management circuit board in a power supply; and second spring connectors, disposed on the bottom surface and electrically coupled to the first spring connectors, which electrically couple to a motherboard. Moreover, a first subset of the first spring connectors and the second spring connectors has a first vertical height when activated, and a second subset of the first spring connectors and the second spring connectors has a second vertical height when activated. Furthermore, the first subset conveys power signals and the second subset conveys monitoring signals for the power supply. Additionally, the first vertical height is larger than the second vertical height so that the first subset is activated before the second subset is activated so that an electrical path between the battery-management circuit board and the motherboard for the power signals is established before an electrical path between the battery-management circuit board and the motherboard for the monitoring signals is established.

Note that the substrate may include vias that electrically couple the first spring connectors and the second spring connectors.

In some embodiments, the power supply includes a battery.

Moreover, the first subset may be divided into power spring connectors and ground spring connectors.

Furthermore, the second subset may be disposed proximate to peripheries of the top surface and the bottom surface.

In some embodiments, the spring connectors in the second subset of the first spring connectors are electrically coupled to each other so that, when the spring connectors in the second subset of the first spring connectors are activated, an electrical path is completed indicating that the interposer and the battery-management circuit board are fully mated and planar. Additionally, the spring connectors in the second subset of the second spring connectors may be electrically coupled to each other so that, when the spring connectors in the second subset of the second spring connectors are activated, an electrical path is completed indicating that the interposer and the motherboard are fully mated and planar.

Note that the top surface and the bottom surface may include mechanical features that align the interposer and the battery-management circuit board, and that align the interposer and the motherboard.

Another embodiment provides a portable electronic device that includes the interposer. This portable electronic device may include the power supply with the battery-management circuit, and the motherboard. Moreover, the power supply may include battery cells, in separate housings, electrically coupled to the battery-management circuit board. This battery-management circuit board may include an integrated circuit with control logic that monitors the battery cells and that regulates charging and discharging of the battery cells.

In some embodiments, the portable electronic device includes stiffener mechanisms disposed on a top surface of the battery-management circuit board and a bottom surface of the motherboard. These stiffener mechanisms may distribute a compressive mechanical coupling force over the top surface of the battery-management circuit board and the bottom surface of the motherboard.

Another embodiment provides a method for operating the power supply in the portable electronic device. During operation, the power supply provides power signals from a battery-management circuit board in the power supply to the motherboard via first spring connectors on the interposer between the battery-management circuit board and the motherboard. Moreover, the power supply provides monitoring signals from the battery-management circuit board to the motherboard via second spring connectors on the interposer, where the first spring connectors have a first vertical height when activated, the second spring connectors have a second vertical height when activated, and the first vertical height is larger than the second vertical height.

BRIEF DESCRIPTION OF THE FIGURES

FIG. 17 is a flowchart illustrating a method for operating a power supply in a portable electronic device in accordance with an embodiment of the present disclosure.

FIG. 19 is a flowchart illustrating a method for removing a battery cell from a portable electronic device in accordance with an embodiment of the present disclosure.

FIG. 20 is a flowchart illustrating a method for removing a battery cell from a portable electronic device in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Figure 1:
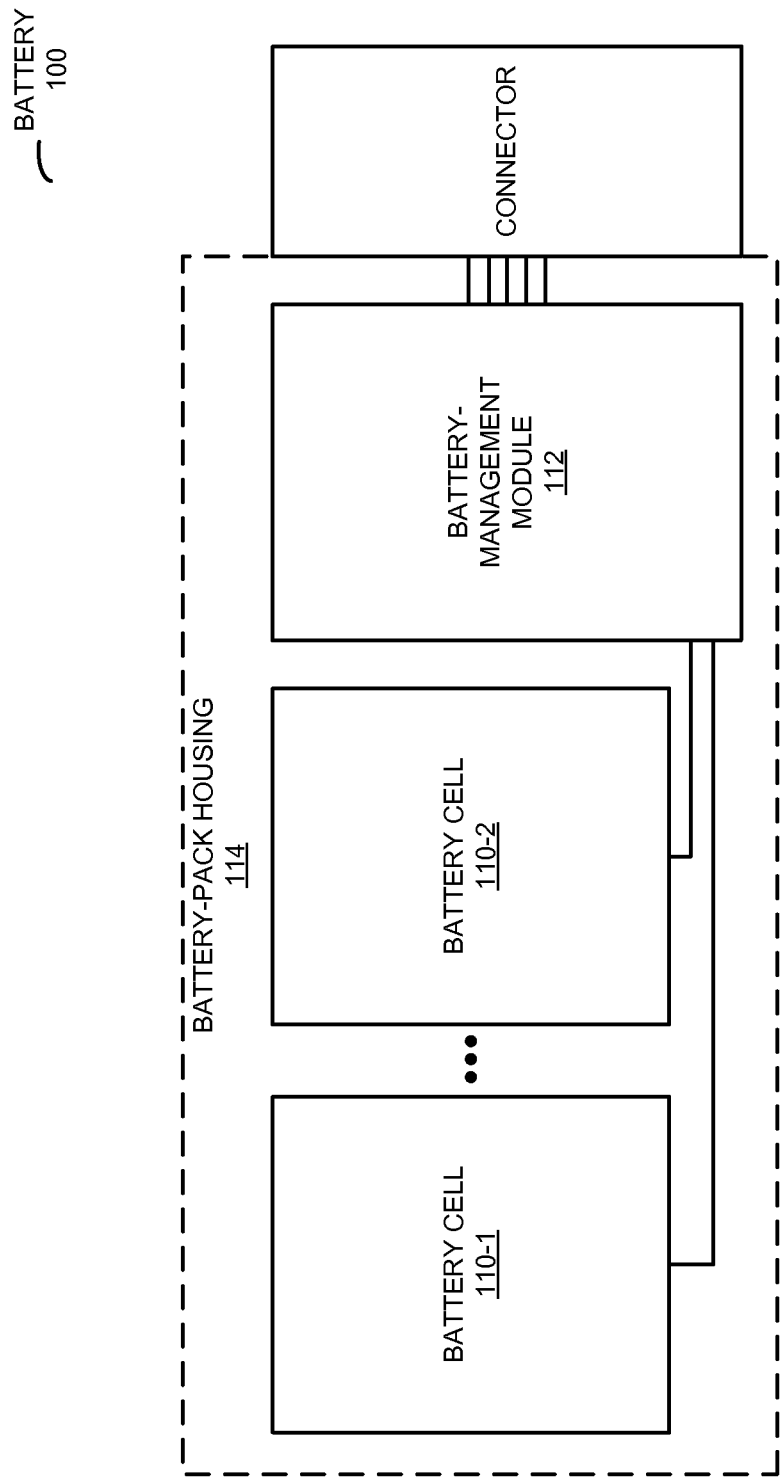
FIG. 1 is a block diagram illustrating an existing battery.
Figure 2:
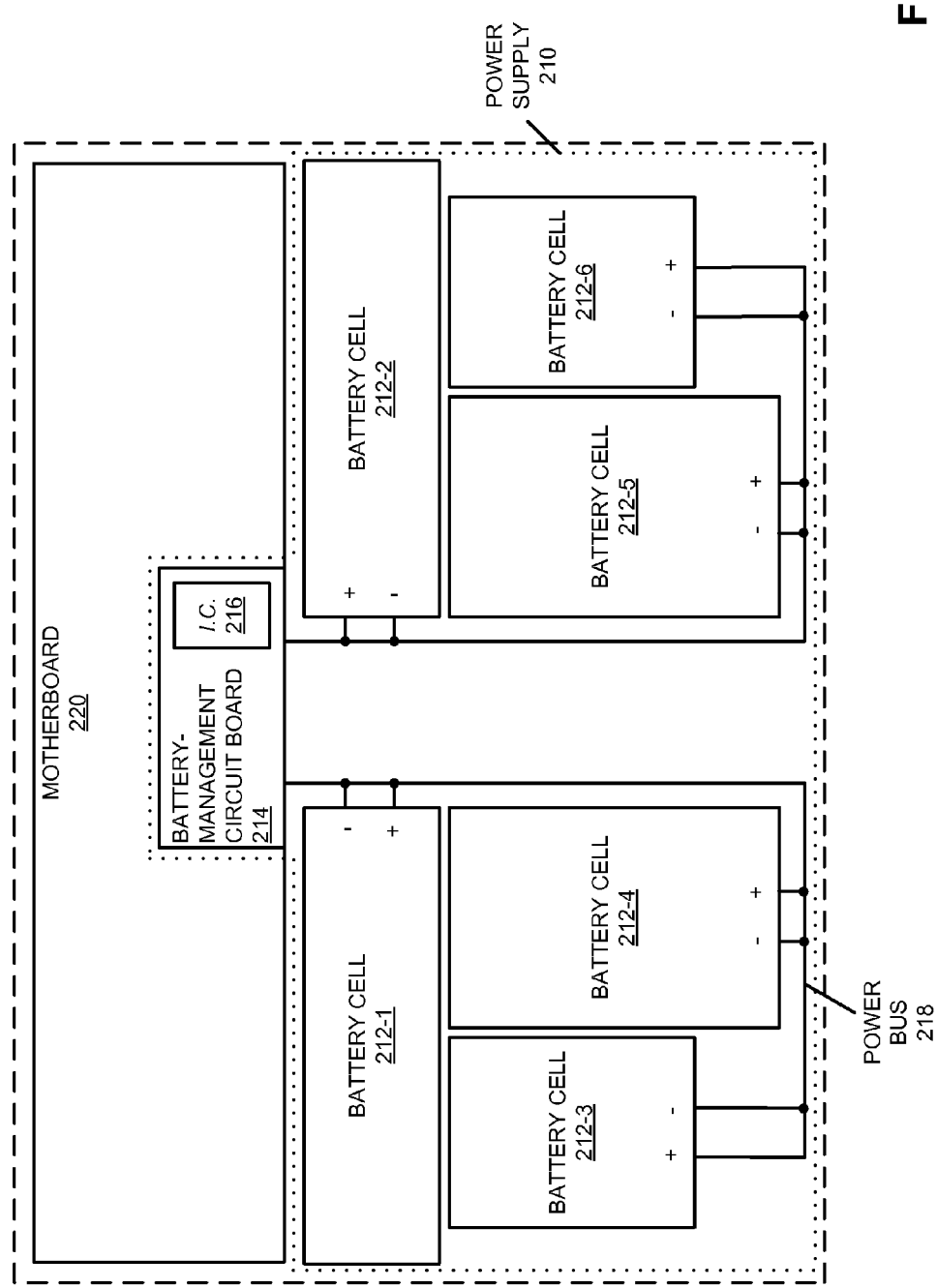
FIG. 2 is a block diagram illustrating a top view of a power supply in a portable electronic device in accordance with an embodiment of the present disclosure.

FIG. 2 presents a block diagram illustrating a top view of a power supply 210 (such as a battery) in a portable electronic device 200. This power supply includes battery cells 212 (e.g., lithium-ion batteries) in separate locations that are electrically coupled by a power bus 218 to a battery-management circuit board 214 or battery-management module, which (as further described below with reference to FIG. 15) includes an integrated circuit 216 with control logic that monitors battery cells 212 and regulates charging and discharging of battery cells 212. Note that battery cells 212 are not enclosed in a common battery-pack housing so that battery cells 212 are mechanically separate from each other. Moreover, battery-management circuit board 214 is external to battery cells 212 and is not enclosed in the battery-pack housing. By excluding the battery-pack housing from power supply 210 (and, more generally, from portable electronic device 200), there may be more space available to expand the sizes, and thus the total capacities, of battery cells 212. As described further below, this design choice may entail including additional features in portable electronic device 200 to integrate power supply 210.

Portable electronic device 200 may include a motherboard 220 that includes additional integrated circuits (such as a processor and/or memory). As described further below with reference to FIG. 4, battery-management circuit board 214 may overlap motherboard 220. For example, battery-management circuit board 214 may be positioned above motherboard 220, and an interposer may provide power and ground connections between electrical connectors on battery-management circuit board 214 and motherboard 220.

Figure 3:
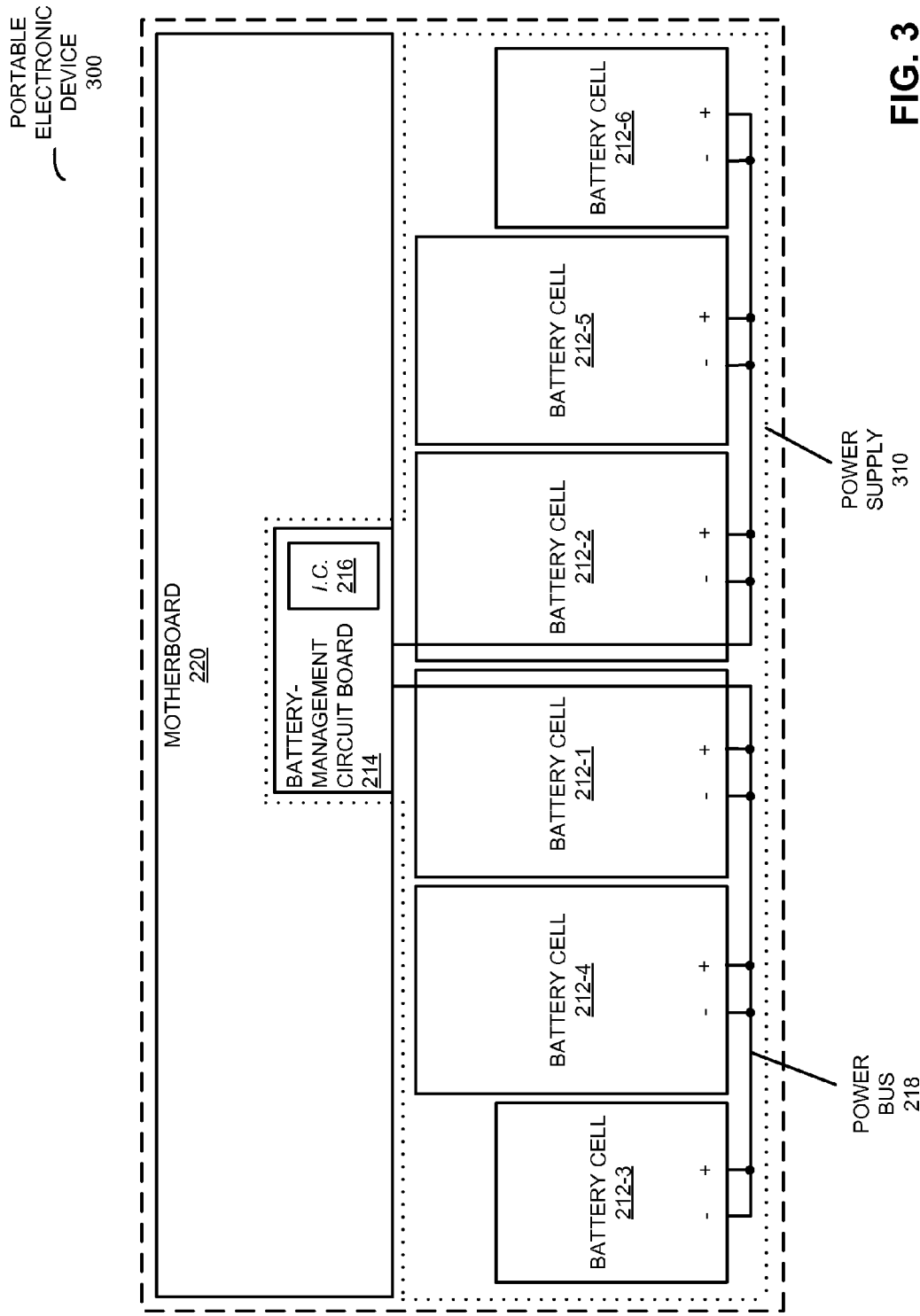
FIG. 3 is a block diagram illustrating a top view of a power supply in a portable electronic device in accordance with an embodiment of the present disclosure.

Another configuration of the battery cells is shown in FIG. 3, which presents a block diagram illustrating a top view of a power supply 310 in a portable electronic device 300.

Figure 4:
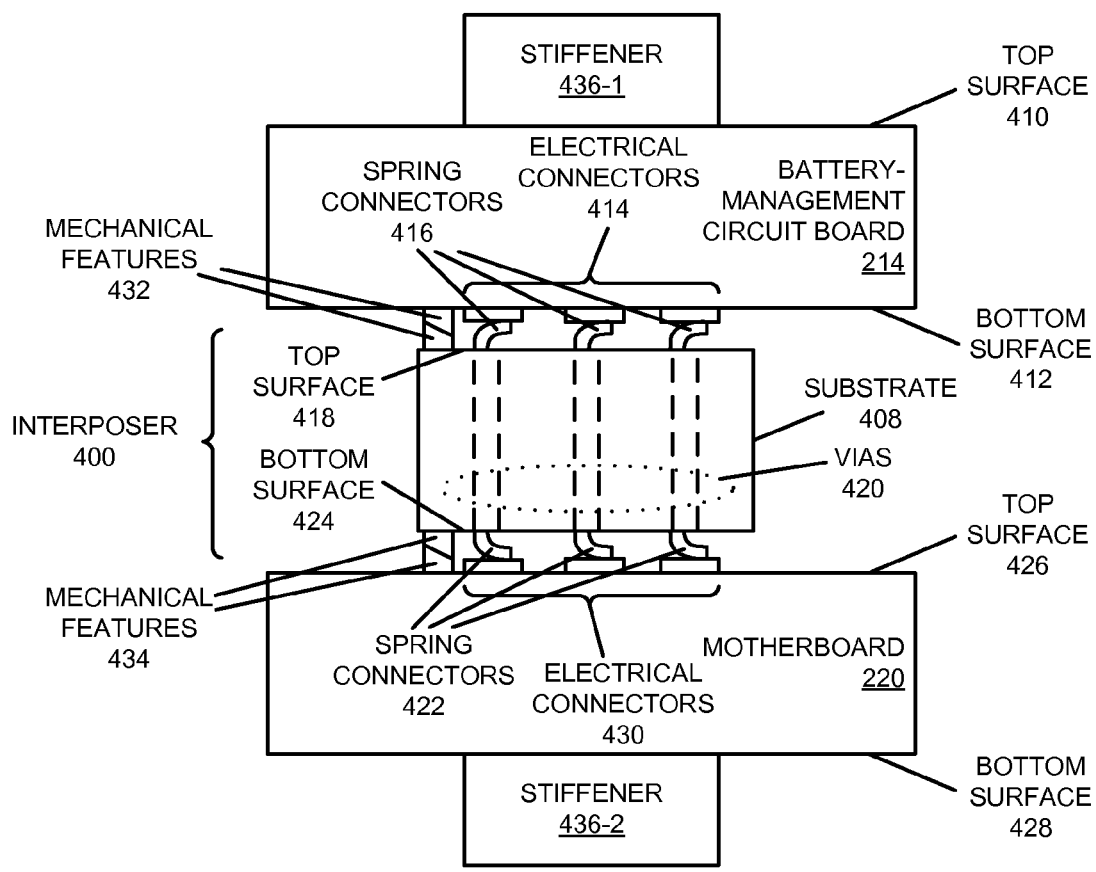
FIG. 4 is a block diagram illustrating a side view of an interposer in the portable electronic device of FIG. 2 or 3 in accordance with an embodiment of the present disclosure.

As noted previously, the battery-management circuit board may be electrically coupled to the motherboard via an interposer. This is shown in FIG. 4, which presents a block diagram illustrating a side view of an interposer 400 in portable electronic device 200 (FIG. 2) or 300 (FIG. 3). In particular, battery-management circuit board 214 has a top surface 410 and a bottom surface 412. Bottom surface 412 includes electrical connectors 414 that electrically couple battery-management circuit board 214 to spring connectors 416 on a top surface 418 of substrate 408 in interposer 400. These spring connectors are electrically coupled by vias 420 through substrate 408 to spring connectors 422 on a bottom surface 424 of substrate 408.

Furthermore, motherboard 220, which is positioned beneath battery-management circuit board 214, has a top surface 426 and a bottom surface 428. Top surface 426 includes electrical connectors 430 that electrically couple motherboard 220 to spring connectors 422.

In an exemplary embodiment, spring connectors 416 and 422 (such as leaf-spring or cantilever fingers) each provide a dense set of 62 interconnects with a pitch of 1 mm. Moreover, each of the spring connectors may include gold deposited on a beryllium-copper base, and may be capable of conducting 1 A of current. Furthermore, interposer 400 may be capable of conducting 13 A of current in total. Note that substrate 408 may include an FR-4 fiberglass-reinforced epoxy-laminate sheet. One possible supplier of interposer 400 is Neoconix™ of Sunnyvale, Calif.

In order to facilitate proper assembly and alignment of battery-management circuit board 214, interposer 400 and motherboard 220, the portable electronic device may include mechanical features. In particular, bottom surface 412 and top surface 418 may include mechanical features 432, such as mating or interlocking mechanical features (e.g., one or more pins or positive features and corresponding slots or negative features), which facilitate alignment of battery-management circuit board 214 and interposer 400 by preventing rotational misalignment. Similarly, bottom surface 424 and top surface 426 may also include mechanical features 434 that facilitate alignment of interposer 400 and motherboard 220.

In addition, the portable electronic device may include stiffener mechanisms 436 (such as washers) disposed on top surface 410 and bottom surface 428. These stiffener mechanisms may distribute a compressive mechanical coupling force (such as that associated with nuts and a screw through the entire structure, which are not shown in FIG. 4) over top surface 410 and bottom surface 428. This may be useful if battery-management circuit board 214 and/or motherboard 220 are thin. A typical thickness for battery-management circuit board 214 is between 0.5 and 1 mm, and a typical thickness for motherboard 220 is between 0.5 and 1.5 mm. Moreover, interposer 400 may have a thickness of 1.8 mm.

Figure 5:
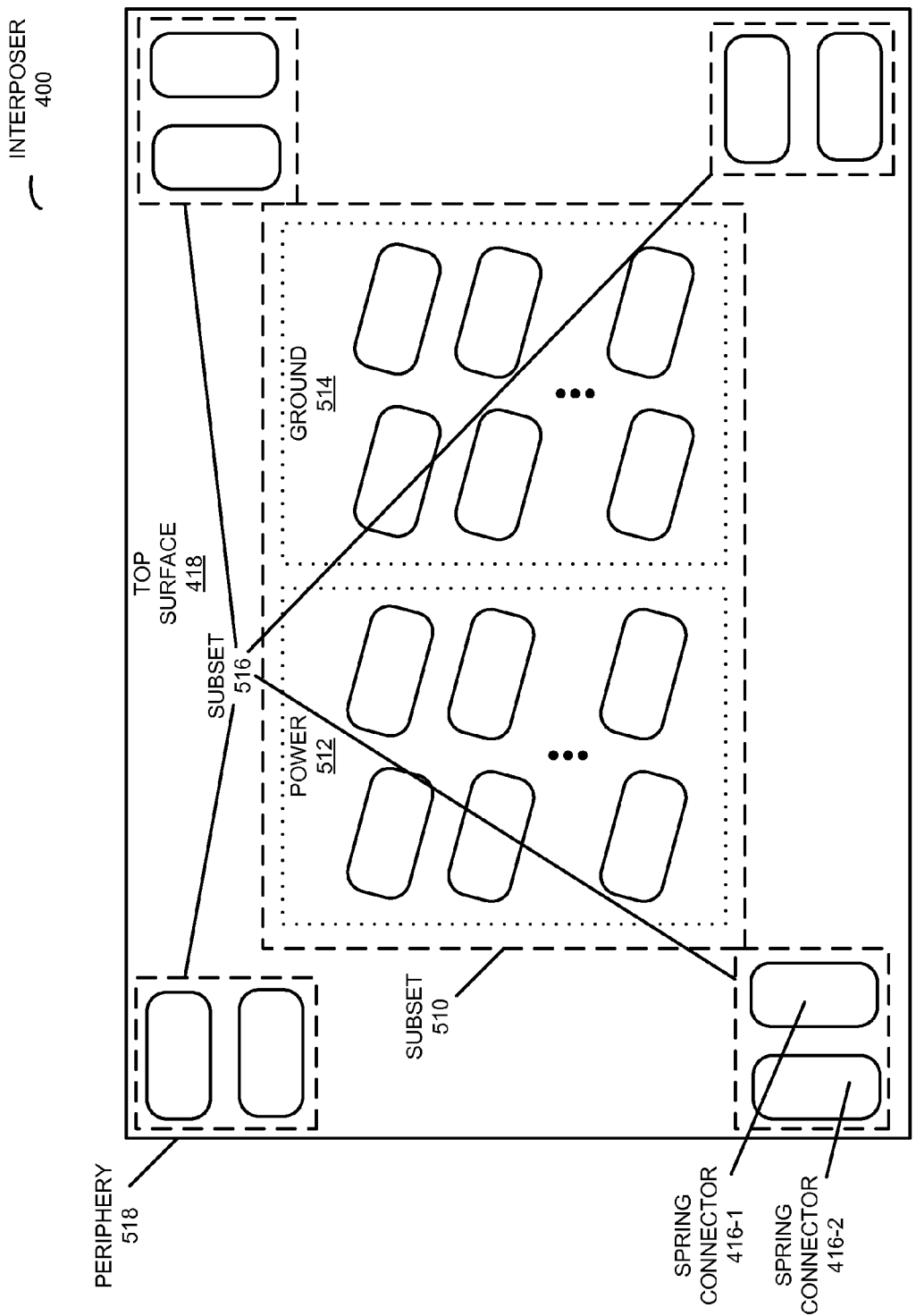
FIG. 5 is a block diagram illustrating a top view of the interposer of FIG. 4 in accordance with an embodiment of the present disclosure.

The electrical paths between battery-management circuit board 214 and motherboard 220 (i.e., electrical connectors 414, spring connectors 416, vias 420, spring connectors 422, and electrical connectors 430) may provide power and ground connections between battery-management circuit board 214 and motherboard 220. This is shown in FIG. 5, which presents a block diagram illustrating a top view of interposer 400. In particular, spring connectors 416 include a subset 510 that convey power signals. This subset may be divided in half into two groups, power connectors 512 and ground connectors 514. (A similar segregation may occur in spring connectors 422. In the discussion that follows, spring connectors 416 are used as an illustration.)

One challenge associated with interposer 400 is to ensure that it is fully mated and planar with battery-management circuit board 214 and motherboard 220 in FIG. 4 before power is conveyed between battery-management circuit board 214 and motherboard 220. To address this challenge, in addition to subset 510, spring connectors 416 may include a dedicated subset 516 (such as 10 spring connectors) that convey monitoring signals for the power supply. Spring connectors in subset 516 may be disposed proximate to periphery 518 of top surface 418, such as near the corners (and a similar subset of spring connectors 422 may be disposed proximate to the periphery of bottom surface 424 in FIG. 4). This may increase the sensitivity of spring connectors in subset 516 to mechanical misalignment and non-planarity because these conditions can be difficult to achieve at periphery 518 (for example, a clamping or compressive mechanical coupling force may roll-off at periphery 518).

Figure 6:
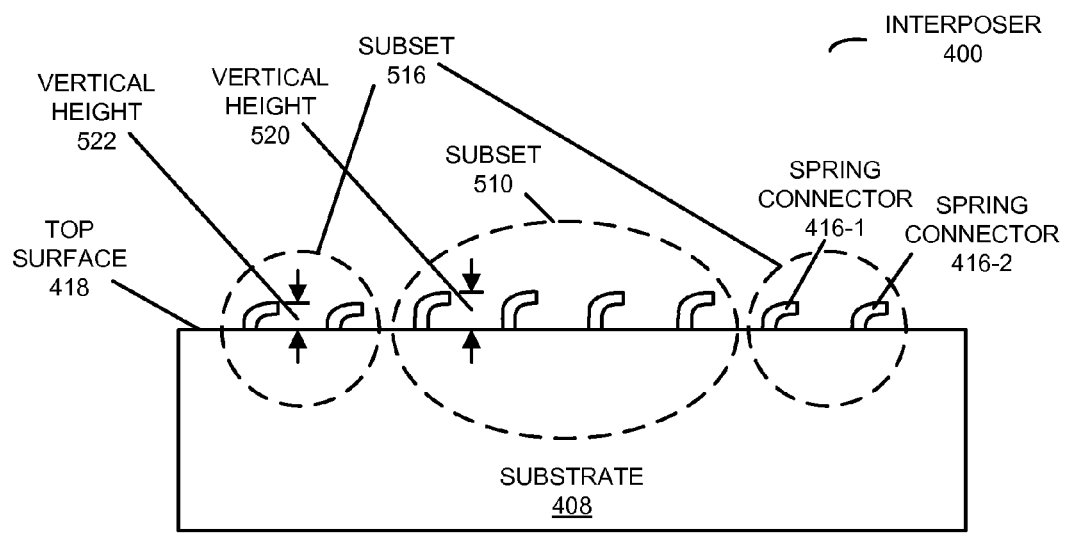
FIG. 6 is a block diagram illustrating a side view of the interposer of FIGS. 5 and 6 in accordance with an embodiment of the present disclosure.

As shown in FIG. 6, which presents a block diagram illustrating a side view of the interposer 400, spring connectors in subset 510 may have a vertical height 520 when activated, and spring connectors in subset 516 may have a vertical height 522 when activated. Vertical height 520 may be larger than vertical height 522 so that subset 510 is activated before subset 516 is activated. This may ensure that an electrical path between battery-management circuit board 214 and motherboard 220 in FIG. 4 for the power signals is established before an electrical path between battery-management circuit board 214 and motherboard 220 in FIG. 4 for the monitoring signals is established. For example, vertical height 520 may be 0.4 mm and vertical height 522 may be 0.3 mm. Note that, on average, a 4-gram force may be needed to activate each of spring connectors in subsets 510 and 516, with a total force for interposer 400 of 2.5 kg. In this way, low impedance electrical connections for the power signals may be established before the monitoring signals are detected by control logic in the portable electronic device and, thus, before the power signals are conveyed between battery-management circuit board 214 and motherboard 220 in FIG. 4.

Figure 7:
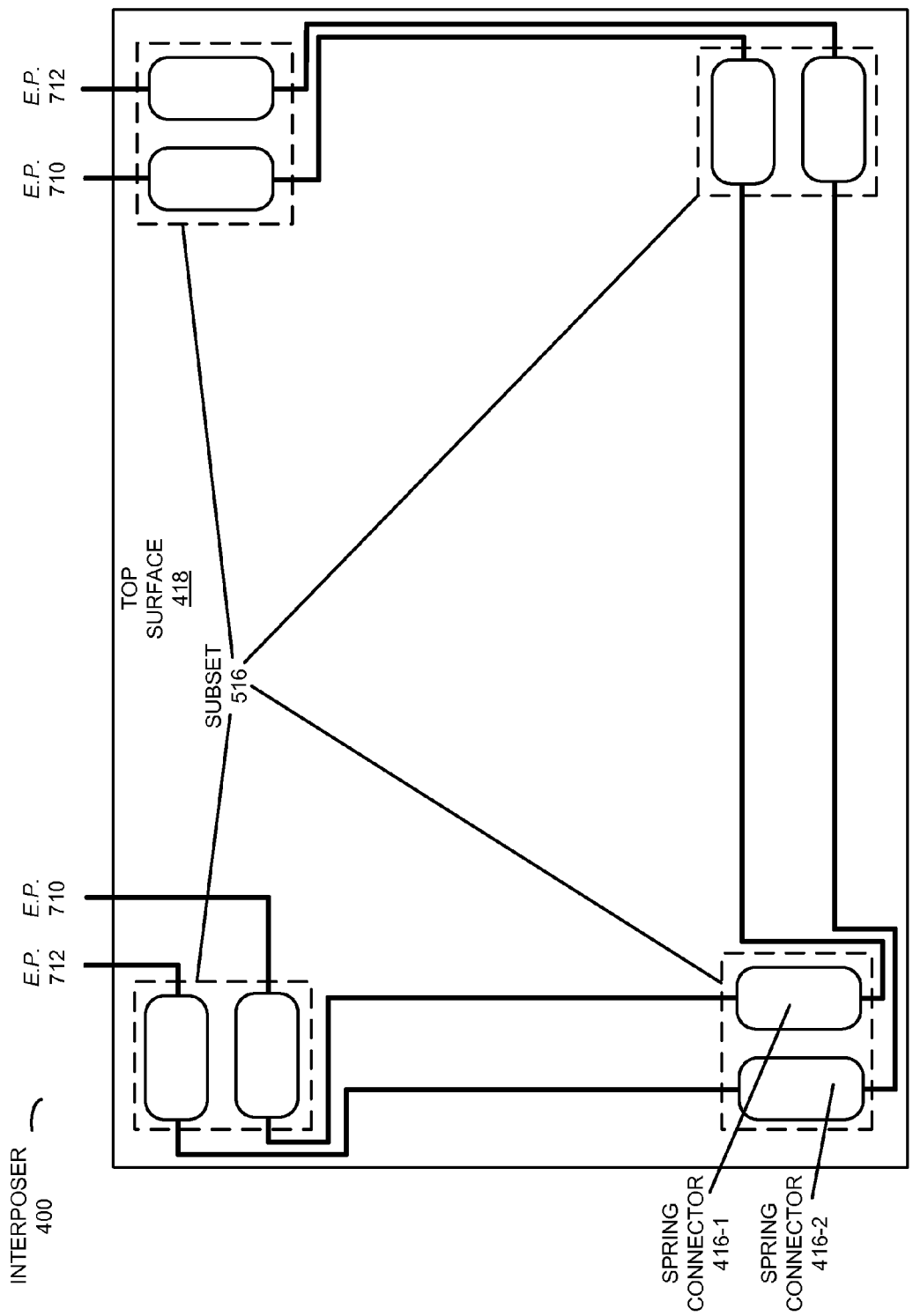
FIG. 7 is a drawing illustrating electrical coupling of spring connectors on the interposer of FIG. 4 in accordance with an embodiment of the present disclosure.

Detecting that the interposer 400 is fully mated and planar with battery-management circuit board 214 and motherboard 220 in FIG. 4 may be facilitated by electrically coupling spring connectors in subset 516. (In addition, subsets of spring connectors 422 may be similarly electrically coupled.) This is shown in FIG. 7, which presents a drawing illustrating electrical coupling of spring connectors 416 in subset 516 on interposer 400. In particular, spring connectors in subset 516 may be electrically coupled to each other in a daisy-chain fashion so that, when these spring connectors are activated, an electrical path (E.P.) 710 is completed indicating that interposer 400 and battery-management circuit board 214 in FIG. 4 are fully mated and planar (thereby ensuring that the portable electronic device can communicate with the power supply before the power is enabled). In addition, spring connectors in subset 516 may be electrically coupled to each other in a daisy-chain fashion so that, when these spring connectors are activated, an electrical path (E.P.) 712 is completed indicating that interposer 400 and motherboard 220 in FIG. 4 are fully mated and planar. While not shown, spring connectors in a subset of spring connectors 422 that convey monitoring signals may also be electrically coupled to each other so that, when these spring connectors are activated, electrical path 710 is completed indicating that interposer 400 and battery-management circuit board 214 in FIG. 4 are fully mated and planar, and electrical path 712 is completed indicating that interposer 400 and motherboard 220 in FIG. 4 are fully mated and planar.

Figure 8:
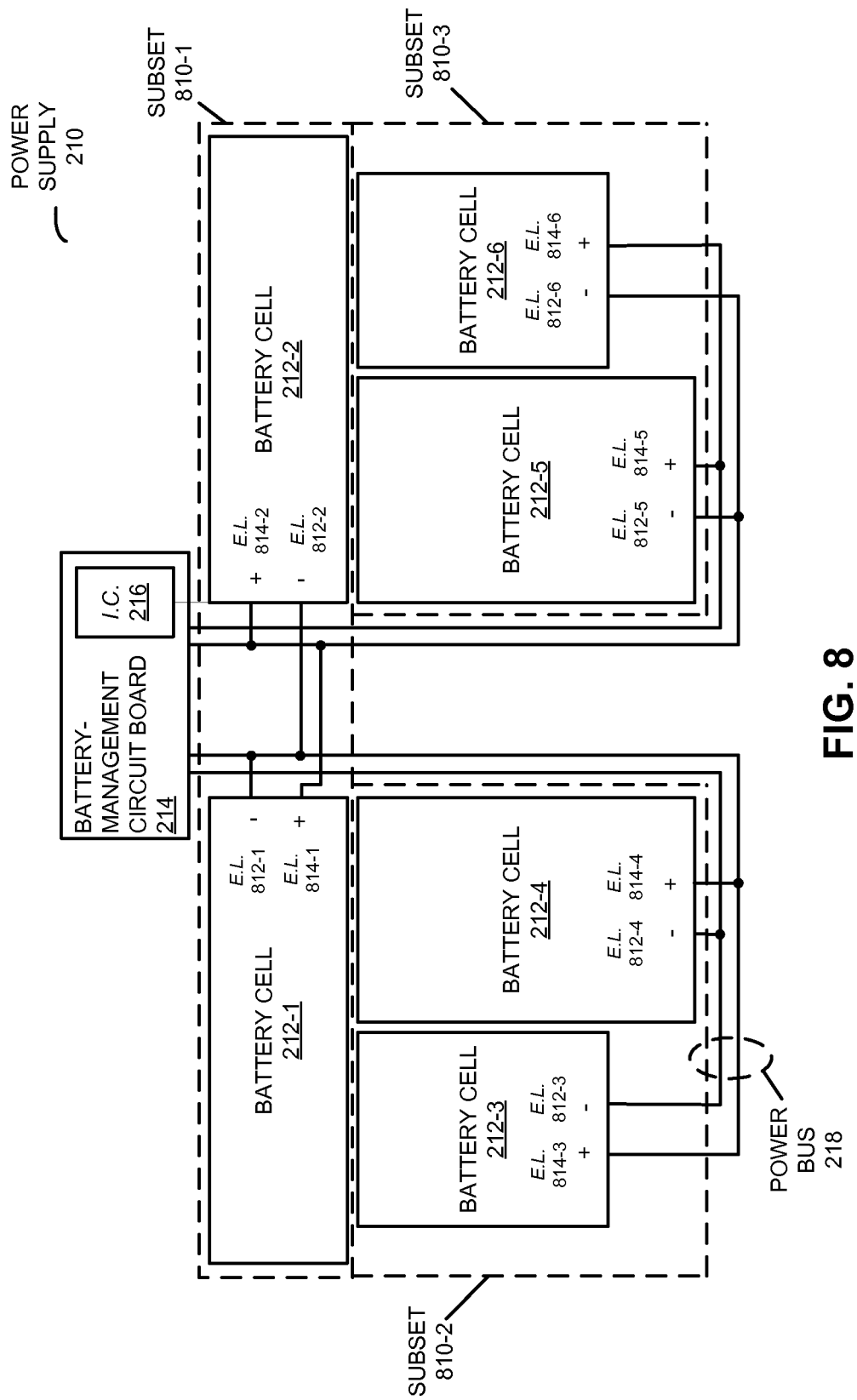
FIG. 8 is a drawing illustrating electrical coupling of battery cells and a battery-management circuit board in the power supply of FIG. 2 in accordance with an embodiment of the present disclosure.

Because of space constraints in the portable electronic device, at least some of battery cells 212 (FIGS. 2 and 3) may have different sizes and, thus, different capacities. However, while at least some of the battery cells may have different capacities, subsets of the battery cells may be electrically coupled to battery-management circuit board 214 (FIGS. 2 and 3) in such a way that each of the subsets has the same total capacity or Watt-hours. This is shown in FIG. 8, which presents a drawing illustrating electrical coupling of battery cells 212 and battery-management circuit board 214 in power supply 210. In this power supply, there are three subsets 810, each of which includes the same number of battery cells (in this example, two) and a total voltage of 4.5 V. While subset 810-1 includes battery cells having the same capacity, subsets 810-2 and 810-3 include battery cells having different geometric sizes and, thus, different capacities. For example, battery cells 212-1 and 212-2 may each have a length of 127.00 mm, a width of 34.30 mm and a thickness of 6.67 mm. Moreover, battery cells 212-3 and 212-6 may each have a length of 60.00 mm, a width of 31.50 mm and a thickness of 9.40 mm, and battery cells 212-4 and 212-5 may each have a length of 75.77 mm, a width of 57.86 mm and a thickness of 9.59 mm.

Furthermore, electrical leads (E.L.s) 812-1 and 812-2 of a first polarity (such as negative or '−') in battery cells in subset 810-1 may be electrically coupled in parallel to the electrical leads 814-3 and 814-4 of a second polarity (such as positive or '+') in battery cells in subset 810-2, and electrical leads 814-1 and 814-2 of the second polarity in battery cells in subset 810-1 may be electrically coupled in parallel to the electrical leads 812-5 and 812-6 of the first polarity in battery cells in subset 810-3. Furthermore, electrical leads 812-3 and 812-4 of the first polarity in battery cells in subset 810-2 may be electrically coupled in parallel and/or electrical leads 814-5 and 814-6 of the second polarity in battery cells in subset 810-3 may be electrically coupled in parallel. In addition to providing subsets 810 with the same total capacity, this wiring configuration may step up the voltage provided by power supply 210.

Figure 9:
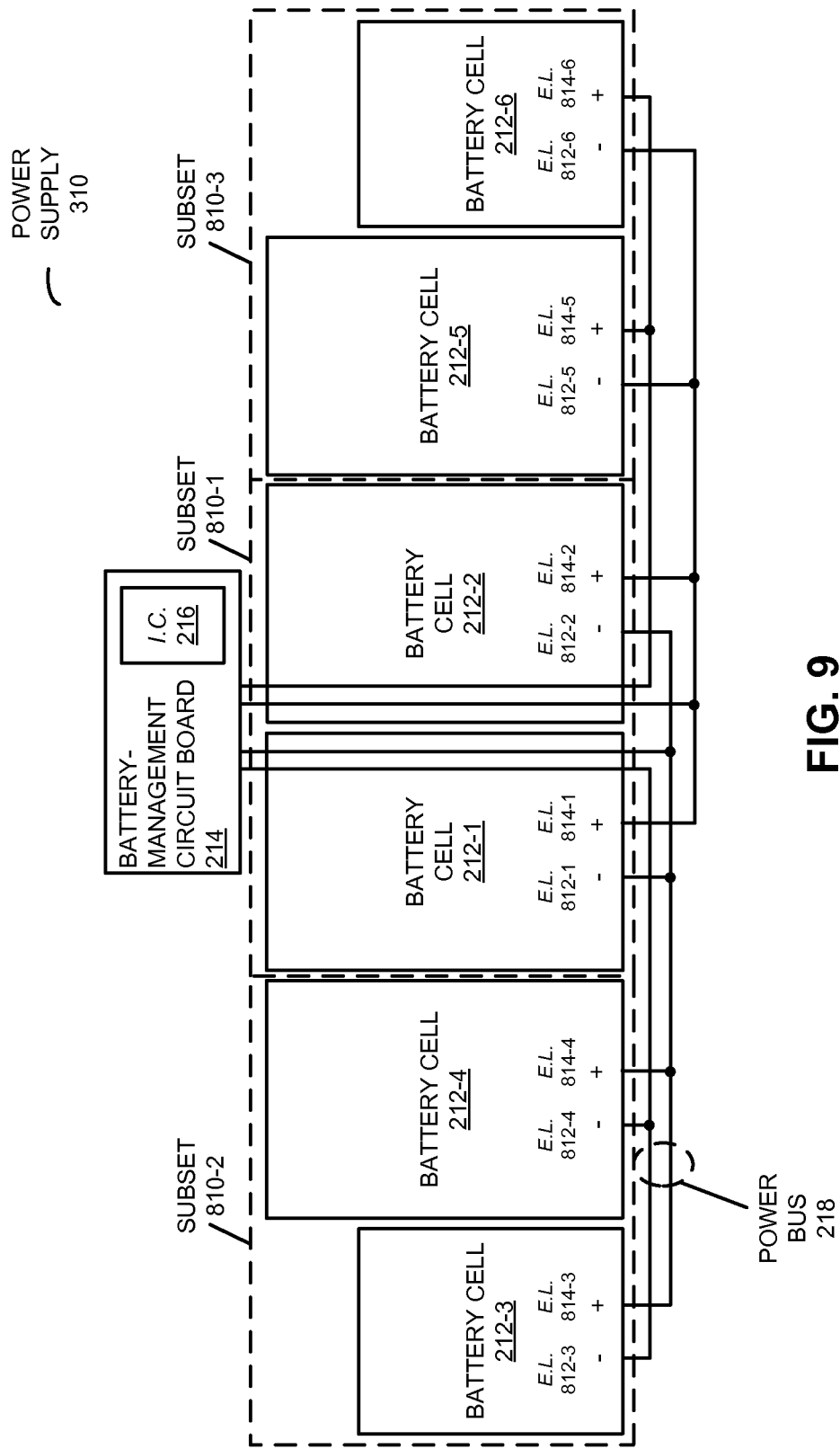
FIG. 9 is a drawing illustrating electrical coupling of battery cells and a battery-management circuit board in the power supply of FIG. 3 in accordance with an embodiment of the present disclosure.

FIG. 9 presents a block diagram illustrating a similar wiring configuration or electrical coupling of battery cells 212 (having different positions and geometric sizes than in FIG. 8) and a battery-management circuit board 214 in power supply 310 (FIG. 3) so that the battery cells with different capacities can be arranged in subsets 810 that have the same total capacity. Note that battery cells 212-1 and 212-2 may each have a length of 93.62 mm, a width of 58.00 mm and a thickness of 6.08 mm. Moreover, battery cells 212-3 and 212-5 may each have a length of 65.00 mm, a width of 55.44 mm and a thickness of 7.90 mm, and battery cells 212-4 and 212-6 may each have a length of 94.01 mm, a width of 50.60 mm and a thickness of 8.12 mm.

Figure 10:
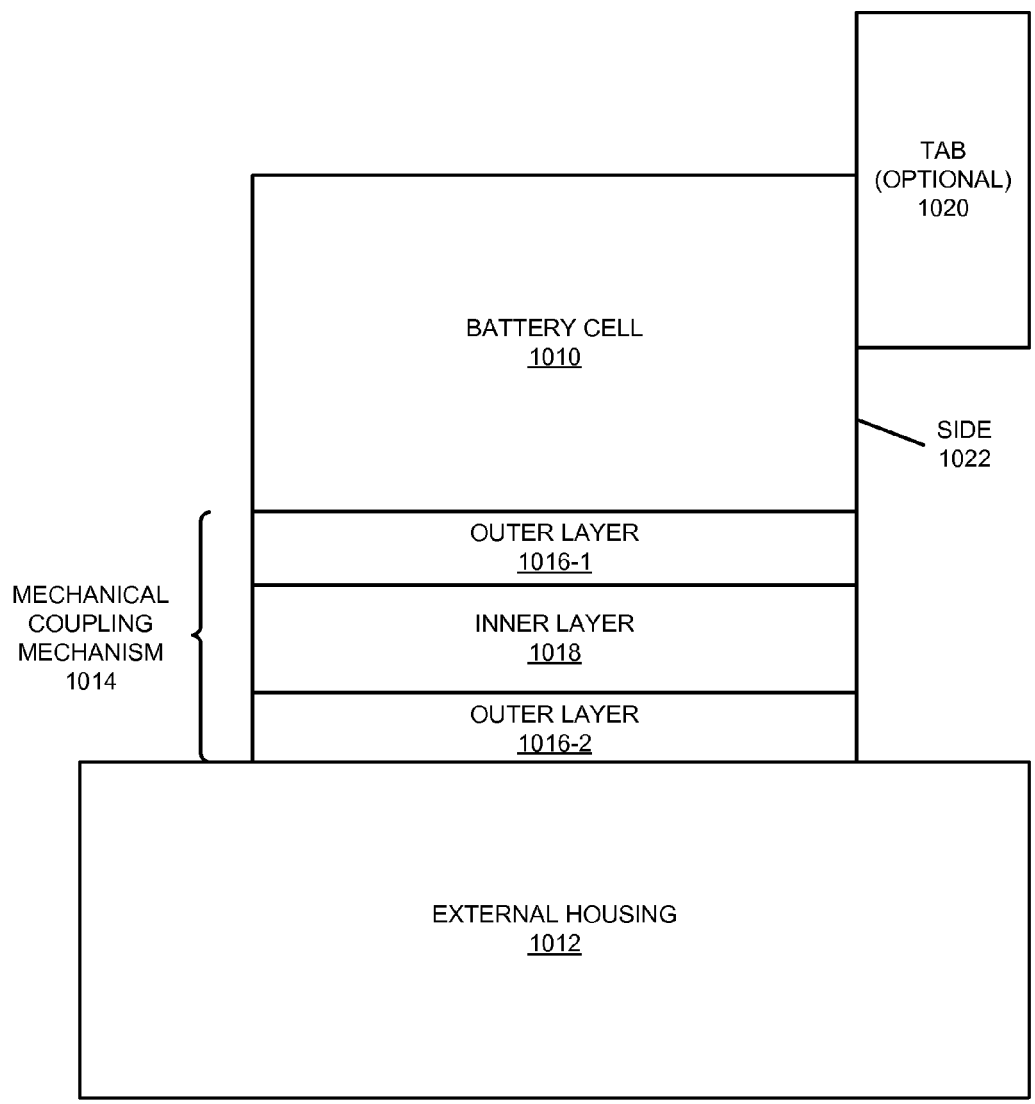
FIG. 10 is a block diagram illustrating a side view of a battery cell in the portable electronic device of FIG. 2 or 3 in accordance with an embodiment of the present disclosure.

FIG. 10 presents a block diagram illustrating a side view of a battery cell 1010 in portable electronic device 200 (FIG. 2) or 300 (FIG. 3), such as one of battery cells 212-3, 212-4, 212-5 and 212-6. This battery cell may be mechanically coupled (for example, it may be directly bonded or adhered) to external housing 1012 (such as a top case of the portable electronic device) by a mechanical coupling mechanism 1014. For example, mechanical coupling mechanism 1014 may include two outer layers 1016 surrounding an inner layer 1018, where inner layer 1018 has a lower sheer strength than either of outer layers 1016. In some embodiments, outer layers 1016 may include an adhesive. Furthermore, inner layer 1018 may include a cross-linked foam (such as that described in U.S. patent application Ser. No. 13/198,586, entitled "Adhesive Stack with a Central Shear Layer, by Mathew P. Casebolt, filed on Aug. 4, 2011, the contents of which are hereby incorporated by reference). More generally, inner layer 1018 may be thermally set, while outer layers 1016 may not be thermally set. This mechanical coupling mechanism may help ensure that the bond strength between battery cell 1010 and external housing 1012 is consistent (and can be tuned or controlled by the mechanical properties of inner layer 1018) and is time invariant (for example, it may not depend on a thermal history of portable electronic device 200 in FIG. 2 or 300 in FIG. 3). In this way, external housing 1012 can be used to provide additional mechanical support to the components (such as the battery cells) in the power supply when the battery-pack housing is excluded from portable electronic device 200 (FIG. 2) or 300 (FIG. 3), thereby reducing possible damage to the power supply. For example, mechanical coupling mechanism 1014 may ensure that portable electronic device 200 (FIG. 2) or 300 (FIG. 3) can withstand the acceleration/deceleration associated with a 60-in vertical drop.

However, because battery cell 1010 is not included in the battery-pack housing, it may be difficult to remove battery cell 1010 from portable electronic device 200 (FIG. 2) or 300 (FIG. 3) without damaging it. For example, when reworking portable electronic device 200 (FIG. 2) or 300 (FIG. 3), battery cell 1010 may be bent when it is detached from external housing 1012.

To address this challenge, an optional tab 1020 may be mechanically coupled to a side 1022 of battery cell 1010. When pulled on, optional tab 1020 may convey a sheer force to mechanical coupling mechanism 1014 to detach battery cell 1010 from external housing 1012. For example, the sheer force may initiate a notch in inner layer 1018 that allows it to be delaminated.

Figure 11:
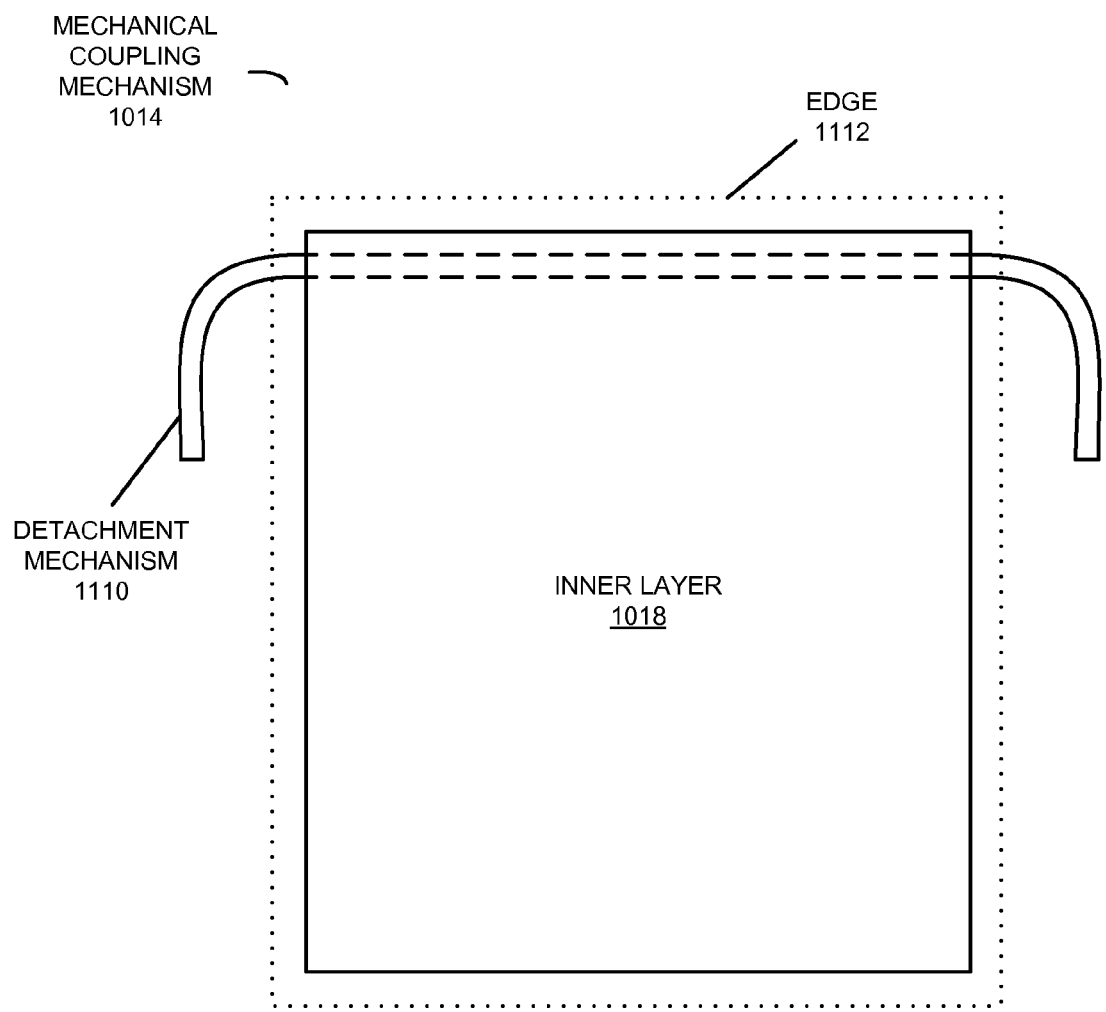
FIG. 11 is a block diagram illustrating a top view of a mechanical coupling mechanism in the portable electronic device of FIG. 2 or 3 in accordance with an embodiment of the present disclosure.
Figure 12:
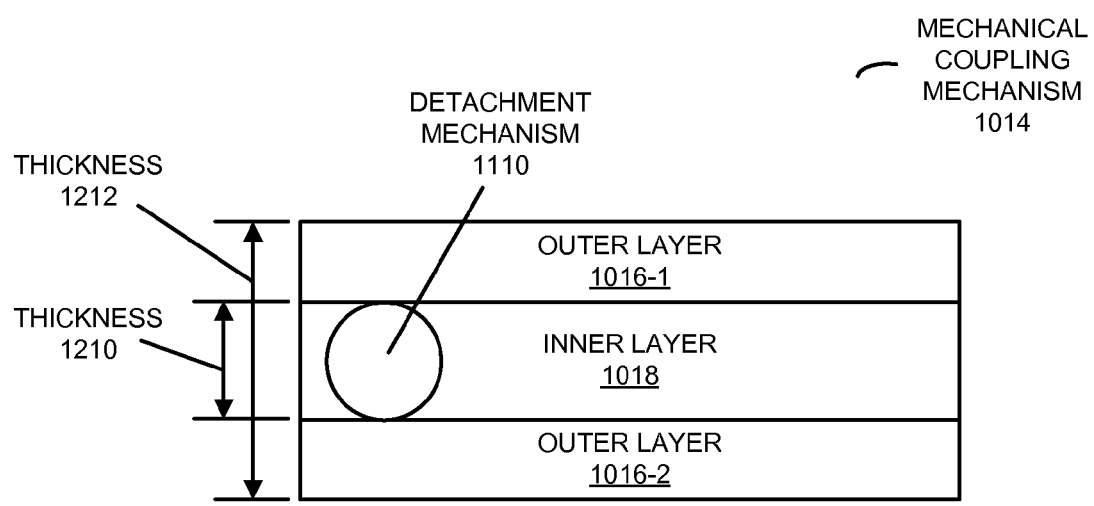
FIG. 12 is a block diagram illustrating a side view of a mechanical coupling mechanism in the portable electronic device of FIG. 2 or 3 in accordance with an embodiment of the present disclosure.

Instead of optional tab 1020 (or in addition to it), a different detachment mechanism may be used. This is shown in FIG. 11, which presents a block diagram illustrating a top view of mechanical coupling mechanism 1014 in portable electronic device 200 (FIG. 2) or 300 (FIG. 3). In particular, detachment mechanism 1110 may be embedded in mechanical coupling mechanism 1014 proximate to edge 1112 of mechanical coupling mechanism 1014. When pulled on (or moved side-to-side in a sawing motion), detachment mechanism 1110 can initiate singulation of inner layer 1018 in a controlled manner with zero strain to detach battery cell 1010 from external housing 1012. For example, detachment mechanism 1110 may include a string, such as a string made of Kevlar® (from the E.I. du Pont de Nemours and Company of Wilmington, Del.). As shown in FIG. 12, which presents a block diagram illustrating a side view of a mechanical coupling mechanism 1014 in portable electronic device 200 (FIG. 2) or 300 (FIG. 3), note that detachment mechanism 1110 may have a thickness 1210 (such as 0.14 mm) approximately the same as thickness 1212 of mechanical coupling mechanism 1014 (such as 0.15 mm).

In these ways, detachment mechanism 1110 may prevent bending of (and thus damage to) battery cell 1010 when battery cell 1010 is detached from external housing 1012. This may allow rework of portable electronic device 200 (FIG. 2) or 300 (FIG. 3).

In portable electronic device 200 (FIG. 2), battery cells 212-1 and 212-2 may be positioned on top of a back surface of a keyboard. If these battery cells are removed (such as during rework of a portable electronic device), this configuration can result in damage to back-lighting elements, such as light-emitting diodes (LEDs), on the back surface. In addition, battery cells 212-1 and 212-2 can be damaged by a compression force and/or bending of portable electronic device 200 (FIG. 2).

Figure 13:
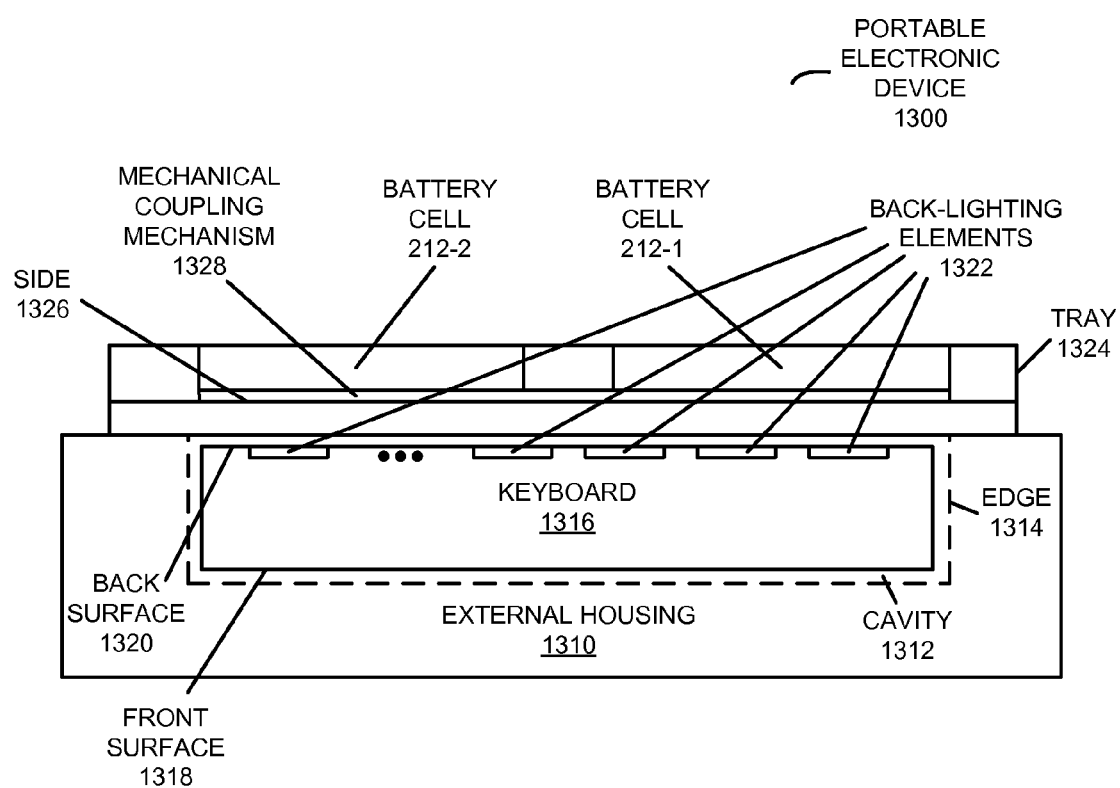
FIG. 13 is a block diagram illustrating a side view of a portable electronic device in accordance with an embodiment of the present disclosure.

These challenges may be addressed using a tray in the configuration shown in FIG. 13, which presents a block diagram illustrating a side view of a portable electronic device 1300, such as portable electronic device 200. In particular, this portable electronic device includes an external housing 1310 that includes a cavity 1312 defined by an edge 1314. A keyboard 1316, having a front surface 1318 and a back surface 1320, is disposed in cavity 1312 with front surface 1318 facing external housing 1310. As noted previously, keyboard 1316 may include back-lighting elements 1322 disposed on back surface 1320.

Moreover, a tray 1324 is disposed over back surface 1320. This tray 1324 may be mechanically coupled to external housing 1310 adjacent to edge 1314. For example, tray 1324 may be mechanically coupled to external housing 1310 using screws.

Furthermore, battery cells 212-1 and 212-2 may be mechanically coupled to an opposite side 1326 of tray 1324 from back surface 1320. For example, battery cells 212-1 and 212-2 may be mechanically coupled to tray 1324 by a mechanical coupling mechanism 1328. In general, mechanical coupling mechanism 1328 may include an adhesive layer. For example, mechanical coupling mechanism 1328 may include two outer layers surrounding an inner layer, and the inner layer may have a lower sheer strength than either of the outer layers. (Thus, mechanical coupling mechanism 1328 may include mechanical coupling mechanism 1014 illustrated in FIGS. 10-12.) Using tray 1324, battery cells 212-1 and 212-2 may be removed from portable electronic device 1300 without damaging keyboard 1316 (e.g., without damaging back-lighting elements 1322).

Figure 14:
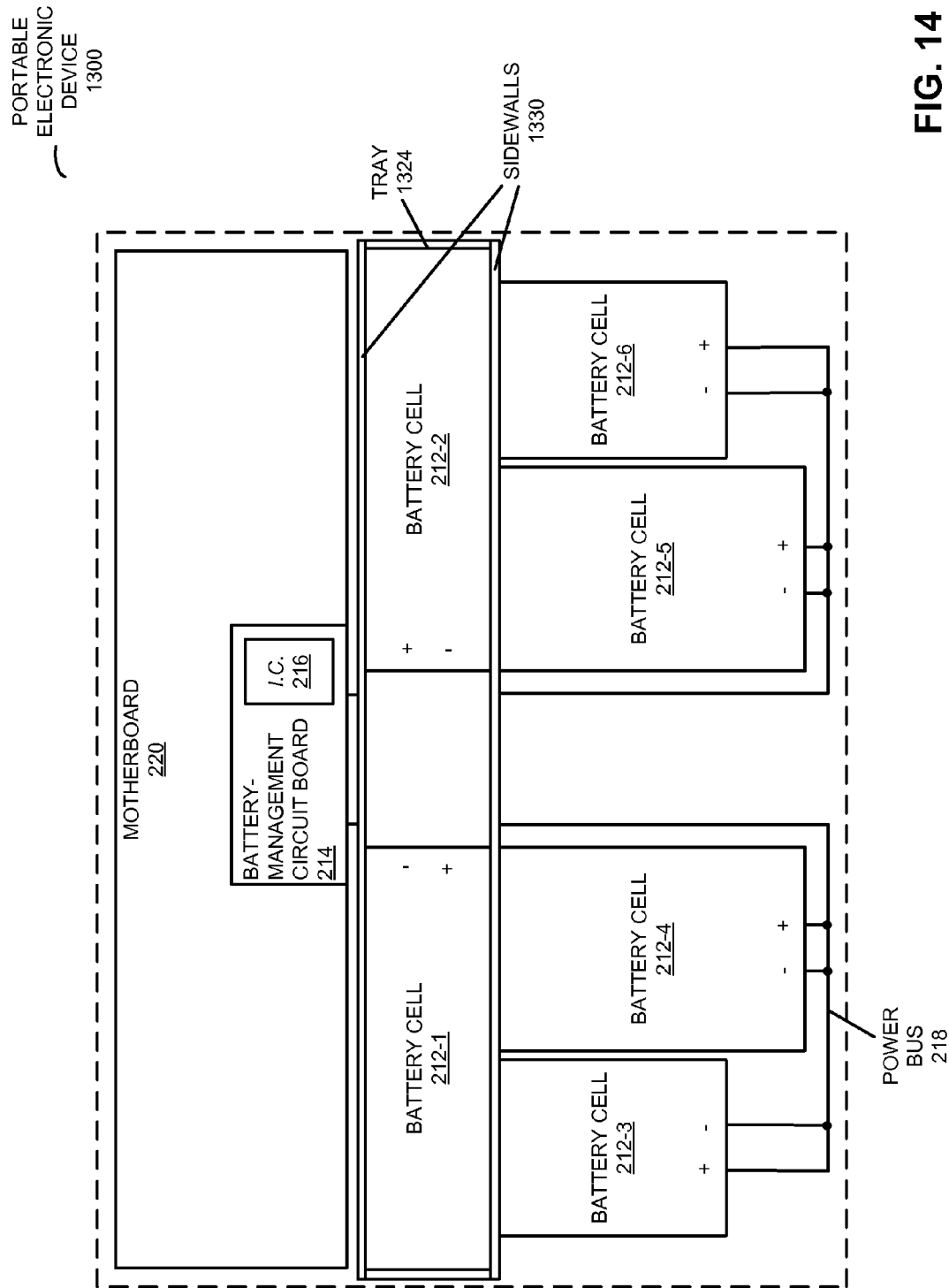
FIG. 14 is a block diagram illustrating a top view of a portable electronic device in accordance with an embodiment of the present disclosure.

As shown in FIG. 14, which presents a block diagram illustrating a top view of a portable electronic device 1300, tray 1324 may include sidewalls 1330. These sidewalls may allow tray 1324 to increase a compressive strength of portable electronic device 1300 and/or a bending strength of portable electronic device 1300.

In an exemplary embodiment, external housing 1310 and tray 1324 are made of metal.

Figure 15:
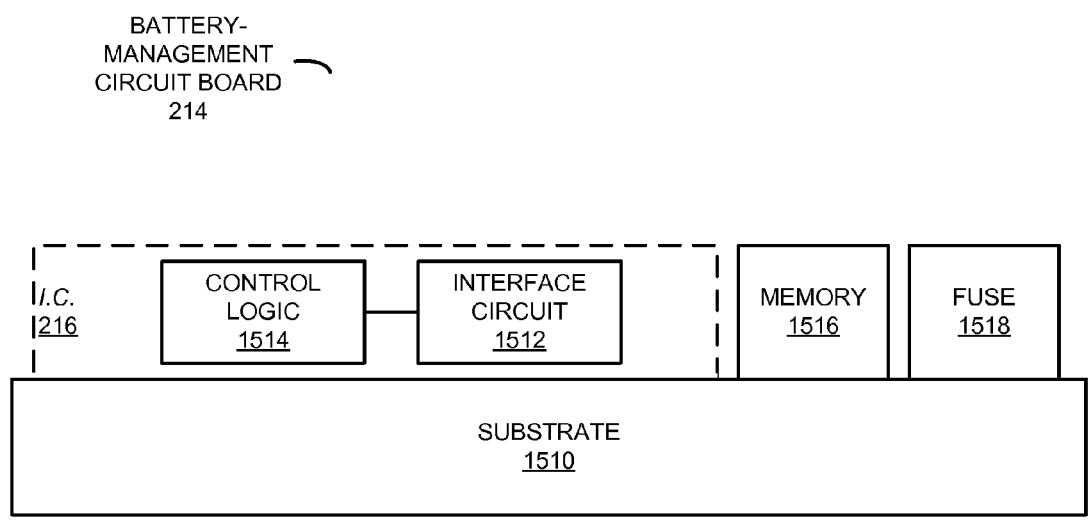
FIG. 15 is a block diagram illustrating a battery-management circuit board in the portable electronic device of FIG. 2 or 3 in accordance with an embodiment of the present disclosure.

Referring back to FIG. 2, in some embodiments control logic in integrated circuit 216 performs a disabling procedure so that battery-management circuit board 214 (and, thus, power supply 210 or power supply 310 in FIG. 3) cannot be reused after it has been removed from the portable electronic device, which may help ensure safety. This is shown in FIG. 15, which presents a block diagram illustrating battery-management circuit board 214. Battery-management circuit board 214 includes: substrate 1510, and integrated circuit 216 disposed on substrate 1510. Moreover, integrated circuit 216 includes: an interface circuit 1512 that receives an instruction code (for example, from motherboard 220 in FIG. 2 or 3); and control logic 1514 that performs a disabling procedure when the instruction code is received. During the disabling procedure, control logic 1514: provides a discharge signal to battery cells 212 (FIGS. 2 and 3) electrically coupled to battery-management circuit board 214; receives confirmation signals from battery cells 212 (FIGS. 2 and 3) that battery cells 212 (FIGS. 2 and 3) are discharged below a threshold; and permanently disables battery-management circuit board 214 so it can no longer charge battery cells 212 (FIGS. 2 and 3). After the disabling procedure, battery-management circuit board 214 (and, thus, power supply 210 or power supply 310 in FIG. 3) can be safely removed from portable electronic device 200 or 300 (FIG. 3).

Note that the threshold may be about 5% of capacity of each of battery cells 212 (FIGS. 2 and 3).

In some embodiments, prior to permanently disabling battery-management circuit board 214, control logic 1514 stores a timestamp and a discharge state of battery cells 212 (FIGS. 2 and 3) in a memory 1516 disposed on battery-management circuit board 214. This stored information may be used in the event of a subsequent safety issue or concern associated with any of battery cells 212 (FIGS. 2 and 3).

Moreover, permanently disabling battery-management circuit board 214 may involve a software fuse and/or a hardware fuse, such as fuse 1518. For example, fuse 1518 may be a thermal fuse.

As noted previously, during normal operation control logic 1514 may monitor battery cells 212 (FIGS. 2 and 3), and may regulate charging and discharging of battery cells 212 (FIGS. 2 and 3).

Portable electronic device 200 (FIG. 2) or 300 (FIG. 3) may include: one or more program modules or sets of instructions stored in an optional memory subsystem on motherboard 220 in FIG. 2 or 3 (such as DRAM or another type of volatile or non-volatile computer-readable memory), which may be executed by an optional processing subsystem on motherboard 220 in FIG. 2 or 3. Note that the one or more computer programs may constitute a computer-program mechanism. Moreover, instructions in the various modules in the optional memory subsystem may be implemented in: a high-level procedural language, an object-oriented programming language, and/or in an assembly or machine language. Furthermore, the programming language may be compiled or interpreted, e.g., configurable or configured, to be executed by the optional processing subsystem.

In some embodiments, functionality in these circuits, components and devices may be implemented in one or more: application-specific integrated circuits (ASICs), field-programmable gate arrays (FPGAs), and/or one or more digital signal processors (DSPs). Moreover, the circuits and components may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

Portable electronic device 200 (FIG. 2) or 300 (FIG. 3) may include one of a variety of devices that can include a power supply, including: a laptop computer, a media player (such as an MP3 player), an appliance, a subnotebook/netbook, a tablet computer, a smartphone, a cellular telephone, a network appliance, a personal digital assistant (PDA), a toy, a controller, a digital signal processor, a game console, a device controller, a computational engine within an appliance, a consumer-electronic device, a portable computing device, a personal organizer, and/or another electronic device.

Additionally, one or more of the components may not be present in FIGS. 2-15. In some embodiments, the preceding embodiments include one or more additional components that are not shown in FIGS. 2-15. Also, although separate components are shown in FIGS. 2-15, in some embodiments some or all of a given component can be integrated into one or more of the other components and/or positions of components can be changed. For example, instead of electrically coupling spring connectors in subset 516 in FIG. 5 (and a corresponding subset of spring connectors 422 in FIG. 4), the electrical coupling may be implemented in a dedicated subset of electrical connectors 414 and 430 in FIG. 4 for the monitoring signals. Furthermore, in embodiments in which battery-management circuit board 214 in FIGS. 2 and 3 is hot-plugged, the monitoring signals may include a clock signal.

In the preceding description, we refer to 'some embodiments.' Note that 'some embodiments' describes a subset of all of the possible embodiments, but does not always specify the same subset of embodiments.

Figure 16:
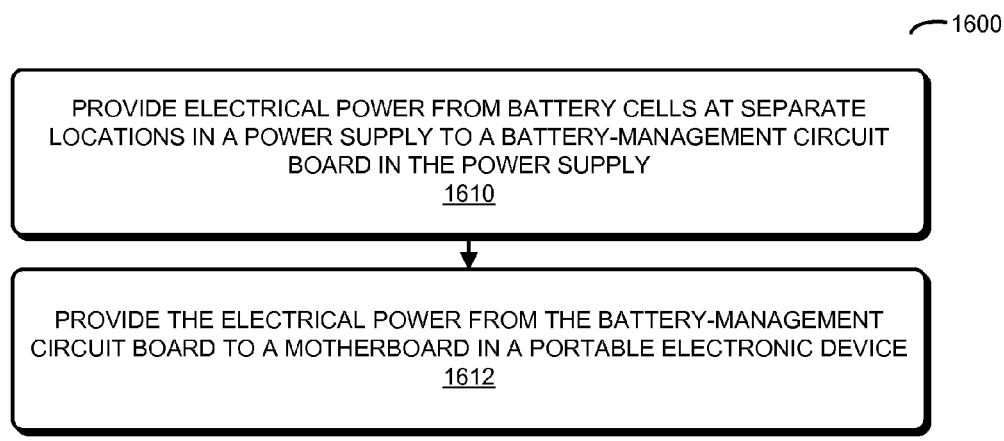
FIG. 16 is a flowchart illustrating a method for operating a power supply in a portable electronic device in accordance with an embodiment of the present disclosure.

We now describe embodiments of methods that can be performed using the preceding embodiments. FIG. 16 presents a flowchart illustrating a method 1600 for operating a power supply in a portable electronic device. During operation, the power supply provides electrical power from battery cells in separate locations in the power supply to a battery-management circuit board in the power supply (operation 1610) that monitors the battery cells and regulates charging and discharging of the battery cells. Note that the battery cells are not enclosed in the common battery-pack housing so that the battery cells are mechanically separate from each other, and the battery-management circuit board is external to the battery cells and is not enclosed in the battery-pack housing. Moreover, the power supply provides the electrical power from the battery-management circuit board to a motherboard in the portable electronic device (operation 1612).

FIG. 17 presents a flowchart illustrating a method 1700 for operating a power supply in a portable electronic device. During operation, the power supply provides electrical power from battery cells in the power supply to a battery-management circuit board in the power supply that monitors the battery cells and regulates charging and discharging of the battery cells. Note that the battery cells include subsets in which at least some of the battery cells have different capacities. Furthermore, the battery cells in each of the subsets are electrically coupled to the battery-management circuit board so that each of the subsets has a common total capacity (operation 1710).

Figure 18:
FIG. 18 is a flowchart illustrating a method for operating a power supply in a portable electronic device in accordance with an embodiment of the present disclosure.

FIG. 18 presents a flowchart illustrating a method 1800 for operating a power supply in a portable electronic device. During operation, the power supply provides power signals from a battery-management circuit board in the power supply to a motherboard via first spring connectors on an interposer (operation 1810) between the battery-management circuit board and the motherboard. Moreover, the power supply provides monitoring signals from the battery-management circuit board to the motherboard via second spring connectors on the interposer (operation 1812), where the first spring connectors have a first vertical height when activated, the second spring connectors have a second vertical height when activated, and the first vertical height is larger than the second vertical height.

FIG. 19 presents a flowchart illustrating a method 1900 for removing a battery cell from a portable electronic device. During the method, a sheer force is applied to a mechanical coupling mechanism that mechanically couples the battery cell to an external housing of the portable electronic device using a tab that is mechanically coupled to a side of the battery cell (operation 1910). Then, after the battery cell is detached from the external housing, the battery cell is removed from the portable electronic device (operation 1912).

FIG. 20 presents a flowchart illustrating a method 2000 for removing a battery cell from a portable electronic device. During the method, a mechanical coupling mechanism that mechanically couples the battery cell to an external housing of the portable electronic device is singulated using a detachment mechanism that is embedded in the mechanical coupling mechanism (operation 2010). Then, after the battery cell is detached from the external housing, the battery cell is removed from the portable electronic device (operation 2012).

Figure 21:
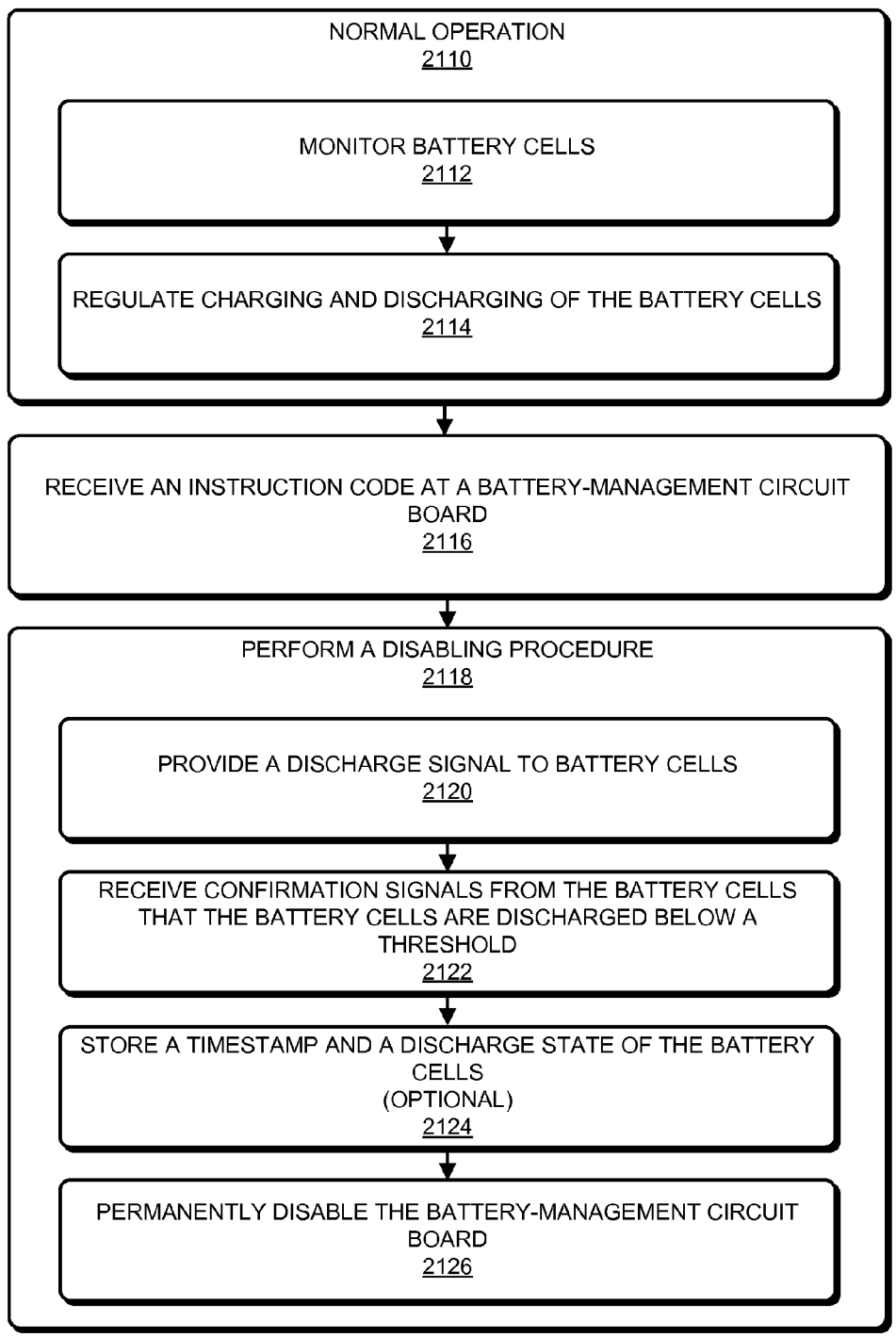
FIG. 21 is a flowchart illustrating a method for disabling a power supply in accordance with an embodiment of the present disclosure.

FIG. 21 presents a flowchart illustrating a method 2100 for disabling a power supply. During operation, a battery-management circuit board in the power supply receives an instruction code (operation 2116). In response to the instruction code, the battery-management circuit board performs a disabling procedure (operation 2118). This disabling procedure includes the operations of: providing a discharge signal to battery cells (operation 2120) in the power supply that are electrically coupled to the battery-management circuit; receiving confirmation signals from the battery cells that the battery cells are discharged below a threshold (operation 2122); and permanently disabling the battery-management circuit board (operation 2126).

In some embodiments, prior to permanently disabling the battery-management circuit board (operation 2126), the disabling procedure involves optionally storing a timestamp and a discharge state of the battery cells (operation 2124), for example, in a memory disposed on the battery-management circuit board.

Note that, during normal operation (operation 2110), the control logic performs the operations of: monitoring the battery cells (operation 2112); and regulating charging and discharging of the battery cells (operation 2114).

In some embodiments of the preceding methods, there may be additional or fewer operations. For example, in operation 1910 (FIG. 19) or 2010 (FIG. 20), the battery cell may be mechanically coupled to an arbitrary surface (not just the external housing). Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An interposer, comprising:
a substrate having a top surface and a bottom surface;
first spring connectors, located at the top surface and configured to couple to a battery-management circuit board in a power supply; and
second spring connectors, located at the bottom surface and electrically coupled to the first spring connectors, and configured to couple to a motherboard, wherein: i) a first subset of the first spring connectors has a first vertical height when not in contact with the battery-management circuit board, ii) a second subset of the first spring connectors has a second vertical height when not in contact with the battery-management circuit board, iii) the first subset is associated with power signals and the second subset is associated with monitoring signals for the power supply, and iv) the first vertical height is larger than the second vertical height.

2. The interposer of claim 1, wherein the substrate includes vias that electrically couple the first spring connectors and the second spring connectors.

3. The interposer of claim 1, wherein the power supply comprises a battery.

4. The interposer of claim 1, wherein the first subset is divided into power spring connectors and ground spring connectors.

5. The interposer of claim 1, wherein the second subset is disposed proximate to peripheries of the top surface and the bottom surface.

6. The interposer of claim 1, wherein the second subset of the first spring connectors are electrically coupled to each other so that, when the second subset of the first spring connectors are in contact with the battery-management circuit board, an electrical path is completed indicating that the interposer and the battery-management circuit board are fully mated and planar.

7. The interposer of claim 1, wherein a subset of the second spring connectors are electrically coupled to each other so that, when the subset of the second spring connectors are in contact with the motherboard, an electrical path is completed indicating that the interposer and the motherboard are fully mated and planar.

8. The interposer of claim 1, wherein the top surface and the bottom surface include mechanical features configured to align the interposer and the battery-management circuit board, and to align the interposer and the motherboard.

9. A portable electronic device, comprising:
a power supply, wherein the power supply includes a battery-management circuit board having a bottom surface that includes electrical connectors;
a motherboard, positioned beneath the battery-management circuit board, having a top surface that includes electrical connectors; and
an interposer, wherein the interposer includes:
  a substrate having a top surface and a bottom surface;
  first spring connectors, located at the top surface of the interposer, and configured to couple to the electrical connectors on the battery-management circuit board; and
  second spring connectors, located at the bottom surface of the interposer and electrically coupled to the first spring connectors, and configured to couple to the electrical connectors on the motherboard, wherein: i) a first subset of the first spring connectors has a first vertical height when not in contact with the battery-management circuit board, ii) a second subset of the first spring connectors has a second vertical height when not in contact with the battery-management circuit board, iii) the first subset is associated with power signals and the second subset is associated with monitoring signals for the power supply and iv) the first vertical height is larger than the second vertical height.

10. The portable electronic device of claim 9, wherein the substrate includes vias that electrically couple the first spring connectors and the second spring connectors.

11. The portable electronic device of claim 9, wherein the power supply comprises a battery.

12. The portable electronic device of claim 9, wherein the power supply further includes battery cells, in separate housings, electrically coupled to the battery-management circuit board; and
wherein the battery-management circuit board includes an integrated circuit with control logic configured to monitor the battery cells and to regulate charging and discharging of the battery cells.

13. The portable electronic device of claim 9, wherein the first subset is divided into power spring connectors and ground spring connectors.

14. The portable electronic device of claim 9, wherein the second subset is disposed proximate to peripheries of the top surface and the bottom surface of the interposer.

15. The portable electronic device of claim 9, wherein the second subset of the first spring connectors are electrically coupled to each other so that, when the second subset of the first spring connectors are in contact with the battery-management circuit board, an electrical path is completed indicating that the interposer and the battery-management circuit board are fully mated and planar.

16. The portable electronic device of claim 9, wherein a subset of the second spring connectors are electrically coupled to each other so that, when the subset of the second spring connectors are in contact with the motherboard, an electrical path is completed indicating that the interposer and the motherboard are fully mated and planar.

17. The portable electronic device of claim 9, wherein the top surface and the bottom surface of the interposer include mechanical features configured to align the interposer and the battery-management circuit board, and to align the interposer and the motherboard.

18. The portable electronic device of claim 9, further comprising stiffener mechanisms disposed on a top surface of the battery-management circuit board and a bottom surface of the motherboard;
wherein the stiffener mechanisms distribute a compressive mechanical coupling force over the top surface of the battery-management circuit board and the bottom surface of the motherboard.

* * * * *